United States Patent
Narayanan et al.

(10) Patent No.: US 10,892,458 B2
(45) Date of Patent: Jan. 12, 2021

(54) BUSBAR FORMING METHOD AND FOLDED BUSBAR

(71) Applicant: Ford Global Technologies, LLC, Dearborn, MI (US)

(72) Inventors: Rajesh Narayanan, Canton, MI (US); Masahiro Kimoto, Plymouth, MI (US); Abdul Lateef, Canton, MI (US); Eid Farha, Ypsilanti, MI (US); Hari Krishna Addanki, Novi, MI (US); John Sturza, Royal Oak, MI (US); Temam Kedir, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 15/841,806

(22) Filed: Dec. 14, 2017

(65) Prior Publication Data

US 2019/0189994 A1 Jun. 20, 2019

(51) Int. Cl.
    *H01M 2/20*    (2006.01)
    *H01M 2/30*    (2006.01)
    *H01M 2/10*    (2006.01)

(52) U.S. Cl.
    CPC ......... *H01M 2/202* (2013.01); *H01M 2/1077* (2013.01); *H01M 2/206* (2013.01); *H01M 2/30* (2013.01); *H01M 2220/20* (2013.01)

(58) Field of Classification Search
    CPC ...... H01M 2/202; H01M 2/30; H01M 2/1077; H01M 2/206
    See application file for complete search history.

(56) References Cited

U.S. PATENT DOCUMENTS

| 9,466,822 | B2  | 10/2016 | Lev et al. |
| 9,496,544 | B2  | 11/2016 | Khakhalev et al. |
| 2010/0266889 | A1* | 10/2010 | Kim ...................... H01M 2/202 |
|  |  |  | 429/158 |
| 2013/0207612 | A1* | 8/2013 | Lev ........................ H01M 2/202 |
|  |  |  | 320/134 |
| 2017/0005313 | A1 | 1/2017 | Ogawa et al. |

FOREIGN PATENT DOCUMENTS

| CN | 104409679 | 3/2015 |
| DE | 102014226576 | 6/2016 |
| JP | 6107570 | 3/2017 |

* cited by examiner

*Primary Examiner* — Olatunji A Godo
(74) *Attorney, Agent, or Firm* — David Kelley, Esq.; Carlson, Gaskey & Olds, P.C.

(57) ABSTRACT

An exemplary busbar forming method includes, among other things, creasing a sheet of material to form a plurality of creases that partition the sheet into a plurality of segments. The method further includes identifying a desired size for a terminal receiving recess in a busbar. In response to the desired size, the method folds at least some of the segments relative to each other about at least some of the creases according to a first process, or a different, second process. An exemplary battery assembly includes, among other things, a busbar formed from a sheet of material. The busbar has a terminal receiving recess. Creases are formed within the sheet that partition at least a portion of the sheet into a plurality of segments. Some of the segments are folded relative to each other about at least some of the creases to provide the terminal receiving recess in the busbar.

18 Claims, 9 Drawing Sheets

BUSBAR FORMING METHOD AND FOLDED BUSBAR

TECHNICAL FIELD

This disclosure relates generally to a busbar and, more particularly, to a sheet of material that can be folded to provide a busbar of a first configuration or another configuration.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively with an internal combustion engine. Electrified vehicles may use electric machines instead of, or in addition to, the internal combustion engine.

A battery pack of an electrified vehicle can include a plurality of battery cells arranged in one or more battery arrays. Busbars can be used to distribute power to and from the battery cells, and to and from the battery pack. The busbars are typically coupled to terminals of the battery cells assemblies, but could be instead, or additionally, be coupled to other areas.

SUMMARY

A busbar forming method according to an exemplary aspect of the present disclosure includes, among other things, creasing a sheet of material to form a plurality of creases that partition the sheet into a plurality of segments. The method further includes identifying a desired size for a terminal receiving recess in a busbar, and in response to the desired size, folding at least some of the segments relative to each other about at least some of the creases according to a first process, or a different, second process.

In a further non-limiting embodiment of the foregoing method, the creases each extend linearly in a direction transverse to a longitudinal axis of the sheet.

In a further non-limiting embodiment of any of the foregoing methods, the creases are distributed along a longitudinal axis of the sheet and each of the creases extends from a first lateral side of the sheet to an opposite, second lateral side of the sheet.

In a further non-limiting embodiment of any of the foregoing methods, the segments are each equally sized.

In a further non-limiting embodiment of any of the foregoing methods, the creasing includes at least partially perforating the sheet to establish the creases.

In a further non-limiting embodiment of any of the foregoing methods, the first process and the second process both include folding some of the same segments relative to each other about some of the same creases.

In a further non-limiting embodiment of any of the foregoing methods, the creases are distributed such that a punch of a tool can fold the sheet according to the first process, and the same punch can fold the sheet according to the second process.

In a further non-limiting embodiment of any of the foregoing methods, a portion of the busbar providing the terminal receiving recess includes a bottom and opposing sides. At least one of the opposing sides includes some of the segments folded against each other.

A further non-limiting embodiment of any of the foregoing methods includes, after the folding, clamping a portion of the busbar providing the terminal receiving recess to sandwich a first number of battery terminal tabs when the desired opening size of the terminal receiving recess is a first size, and clamping the portion of the busbar providing the terminal receiving recess to sandwich a different, second number of battery terminal tabs when the desired opening size of terminal receiving recess is a different, second size.

In a further non-limiting embodiment of any of the foregoing methods, the busbar extends along a longitudinal axis, and the clamping includes directly contacting opposing axially facing sides of the portion of the busbar providing the terminal receiving recess.

In a further non-limiting embodiment of any of the foregoing methods, the terminal receiving recess is a first terminal receiving recess. The method further includes folding at least some of the segments relative to each other about some of the creases to provide a second terminal receiving recess in the busbar that is spaced from the first terminal receiving recess.

A further non-limiting embodiment of any of the foregoing methods includes clamping the first and second terminal recesses to a respective first and second group of battery terminal tabs, and using a portion of the busbar extending between the first and second terminal recesses as a spring to accommodate movement of the first and second groups of battery terminal tabs relative to each other during operation.

A battery assembly according to another exemplary aspect of the present disclosure includes, among other things, a busbar formed from a sheet of material. The busbar has a terminal receiving recess. Creases are formed within the sheet that partition at least a portion of the sheet into a plurality of segments. Some of the segments are folded relative to each other about at least some of the creases to provide to provide the terminal receiving recess in the busbar.

In a further non-limiting embodiment of the foregoing assembly, the terminal receiving recess is a first terminal receiving recess of a first size. At least some of the segments are capable of being folded relative to each other about at least some of the creases to provide a busbar having a second terminal receiving recess of a different, second size.

In a further non-limiting embodiment of any of the foregoing assemblies, the plurality of segments are equally sized.

In a further non-limiting embodiment of any of the foregoing assemblies, at least some of the creases about which some of the segments are capable of being folded to provide the busbar having the terminal receiving recess of the first size are the same as the creases about which some of the segments are capable of being folded to provide the busbar having the terminal receiving recess of the second size.

In a further non-limiting embodiment of any of the foregoing assemblies, the creases each extend transverse to a longitudinal axis of the sheet, and the creases are distributed along the longitudinal axis such that the plurality of creases divide the sheet into a plurality of segments that are equally sized.

In a further non-limiting embodiment of any of the foregoing assemblies, the creases are areas of the sheet of material that are at least partially perforated.

In a further non-limiting embodiment of any of the foregoing assemblies, at least one terminal of a battery is sandwiched within the terminal receiving recess.

In a further non-limiting embodiment of the foregoing assembly, the at least one terminal includes a first terminal tab extending a first distance from an outermost case of a first battery cell. The assembly further includes a second terminal tab extending a greater, second distance from an outermost case of second battery cell such that a portion of the first terminal tab outside the case is longer a portion of the second terminal tab that is outside the case.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details busbars that are used to distribute power to, from, and among battery cells of an electrified vehicle traction battery.

In particular, the busbars can be processed from a sheet of material to have multiple configurations. The varied configurations can facilitate coupling the busbar to different numbers of terminal tabs. Providing varied configurations of busbars from a similarly sized sheet of material can, among other things, reduce build complexity. The processing of the sheet of material can include folding the sheet of material to effectively increase a thickness of the sheet of material.

Figure 1:
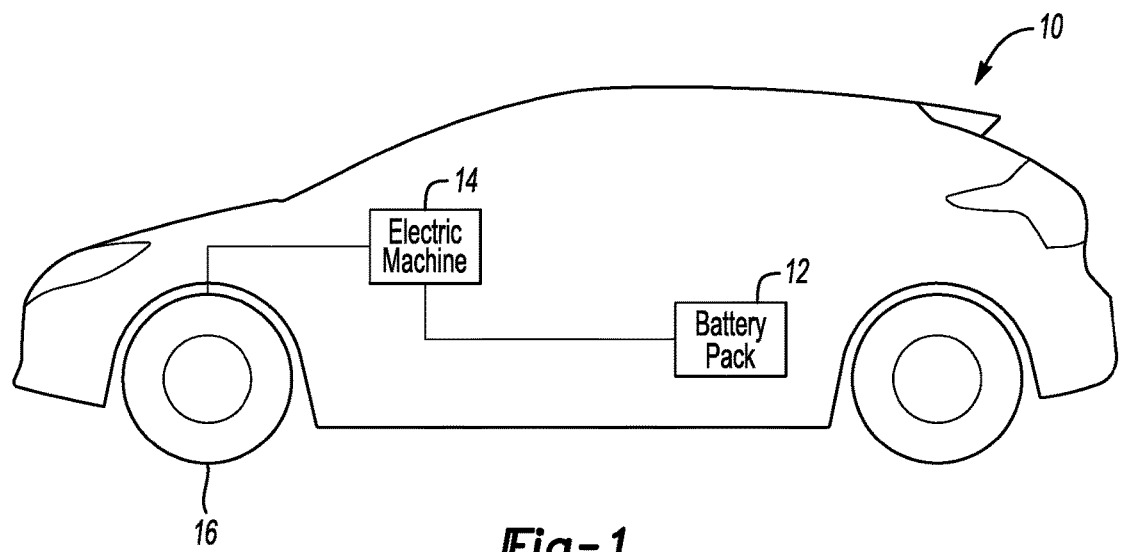
FIG. 1 illustrates a schematic view of a powertrain of an electrified vehicle.

Referring to FIG. 1, an example electrified vehicle 10 includes a battery pack 12, an electric machine 14, and a pair of wheels 16. The example electrified vehicle 10 is an all-electric vehicle.

Power from the battery pack 12 can be used to drive the electric machine 14. In response, the electric machine 14 can generate torque to drive the wheels 16. The battery pack 12 can be considered relatively a high-voltage traction battery pack.

Although depicted as an all-electric vehicle, it should be understood that the concepts described herein are not limited to all-electric vehicles and could extend to other types of electrified vehicles. The electrified vehicle 10 could be, for example, a hybrid electric vehicle, which can selectively drive the wheels 16 with torque provided by an internal combustion engine instead of, or in addition to, the electric machine. Other electrified vehicles could include, but not limited to, plug-in hybrid electric vehicles (PHEVs), battery electric vehicles (BEVs), and fuel cell vehicles.

Figure 2:
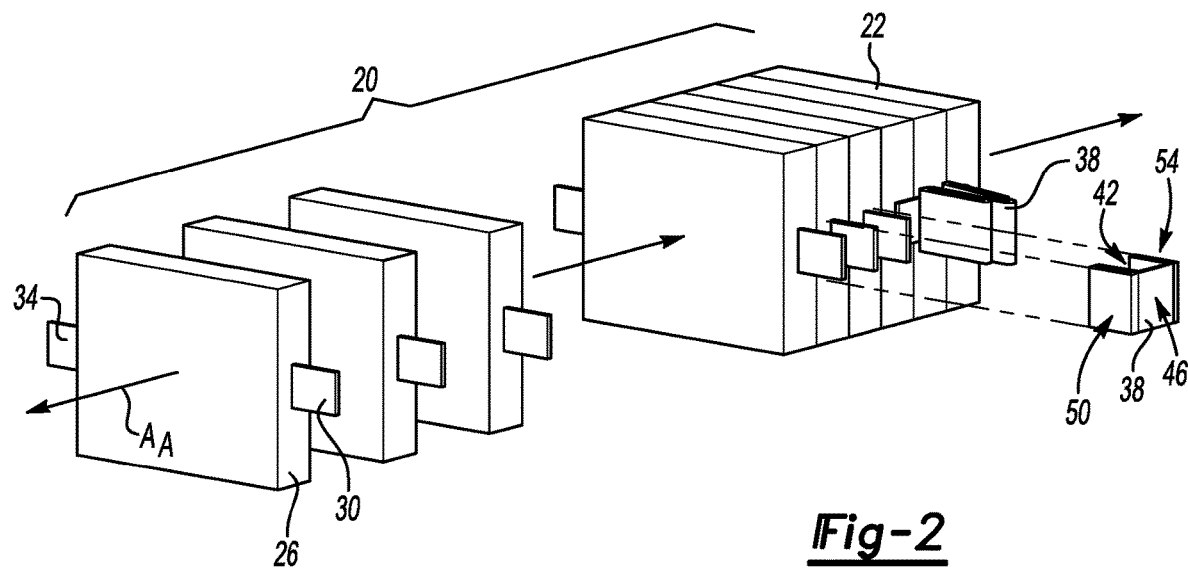
FIG. 2 illustrates a partially expanded view of selected portions of an array of battery cells from the battery pack of FIG. 1.

Referring to FIG. 2, with continued reference to FIG. 1, the battery pack 12 can include an array 20 of battery cells 22. The battery cells 22 can be arranged in the array 20 along an array axis $A_A$. One or more of the arrays 20 is then housed within an enclosure to provide the battery pack 12.

FIG. 2 shows nine battery cells 22 within the array 20. Additional cells can be added to the array 20, as required.

The battery cells 22, in this exemplary embodiment, are lithium-ion pouch cells. The battery cell 22 each include an electrode structure held within an outer case 26, a terminal tab 30 of a positive polarity, and a terminal tab 34 of a negative polarity. An axial width of the battery cells 22 can be, for example, from 15 to 17 millimeters.

With reference to one of the battery cells 22, the terminal tabs 30 and 34 extend from opposing lateral sides the battery cell 22. In other examples, one or both of the terminal tabs 30 and 34 could instead extend from another side of the battery cell 22. The terminal tabs 30 and 34 could both extend from a common side of the battery cell 22.

In the exemplary embodiment, a plurality of busbars 38 are each clamped to one or more of the terminal tabs 30 and 34. In FIG. 2, one of the busbars 38 is shown prior to clamping to three of the terminal tabs 30, and the other busbar 38 is shown clamping three of the terminal tabs 30. The clamping of the busbar 38 to the terminal tabs 30 electrically couples together the busbar 38 and the terminal tabs 30. In this example, the busbars 38 each clamp together three of the terminal tabs 30 to connect those terminal tabs 30 in parallel.

FIG. 2 shows only two of the busbars 38 for drawing clarity. The fully assembled array 20 could include additional busbars 38 to connect to the remaining terminal tabs 30 and 34. The busbars 38 can electrically connect together the battery cells 22 in series, or parallel, and to other structures as desired.

The busbar 38 includes a terminal receiving recess 42 that is generally defined by a floor 46 and a pair of opposing walls 50 and 54 that extend from opposite sides of the floor 46. When securing the busbar 38 to the terminal tabs 30, the terminal tabs 30 are placed within the terminal receiving recess 42. The walls 50 and 54 are then pressed together to clamp the terminal tabs 30.

In the exemplary embodiment, the busbar 38 is configured such that the wall 50 includes three layers of a sheet of material, and the wall 54 includes two layers of the sheet of material 60. The floor 46 includes a single layer of the sheet of material. The multiple layers within the walls 50 and 54 are provided by folding the sheet of the material.

Again, the thickness T of the sheet of material 60 in the exemplary embodiment is a thickness that is appropriate for handling the current requirements for the battery pack 12. In some other embodiments, however, the thickness T is less than a thickness appropriate for handling the current requirements of the battery pack 12. In such other embodiments, the folding of the sheet of material 60 can provide the thickness necessary for handing the current requirements of the battery pack 60. That is, the wall 54 having the thickness of 2T after folding could, in some embodiments, be appropriate for handling the current requirements of the battery pack 12, but not if the wall 54 were instead a single layer having the thickness T.

Figure 3:
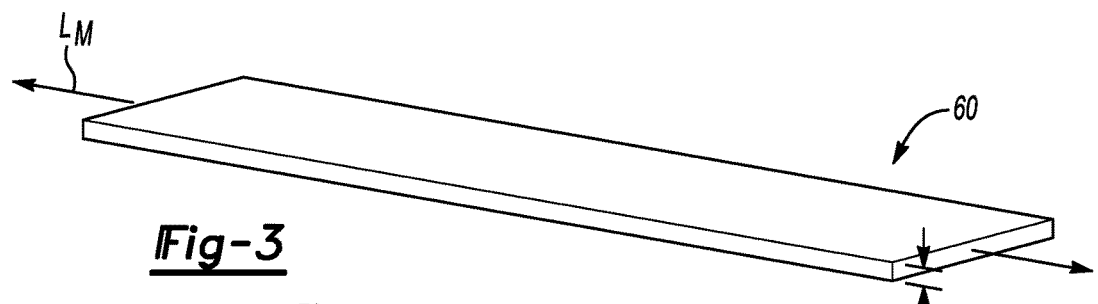
FIG. 3 illustrates a sheet of material utilized to form a busbar that electrically couples together some of the battery cells of FIG. 2.

With reference to FIG. 3, a sheet of material 60 is stamped or provided by another process. The sheet of material 60 extends along a longitudinal axis $L_m$. The sheet of material 60 has a thickness T. In some examples, the thickness T is from 1.2 to 1.5 millimeters. The thickness T can be a thickness that is appropriate for handling the current requirements for the battery pack 12.

Figure 4:
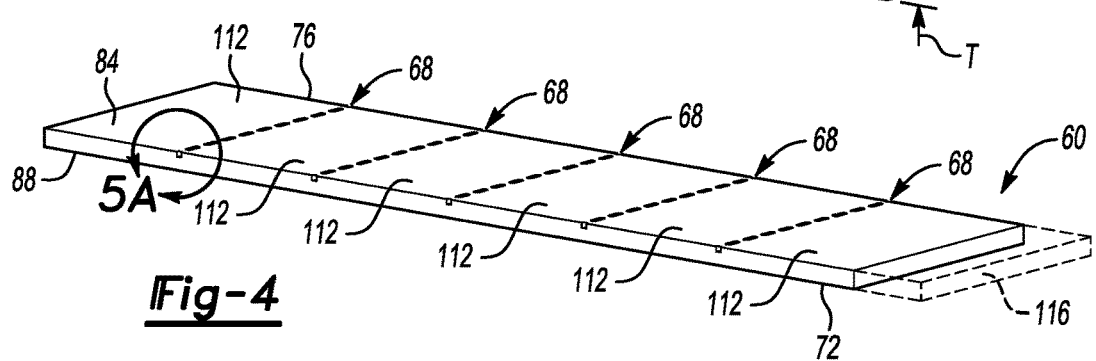
FIG. 4 illustrates the sheet of FIG. 3 after creasing the sheet to form a plurality of creases that partition the sheet into segments.

FIG. 4 shows the sheet of material 60 after creasing the sheet of material 60 to form a plurality of creases 68. The creases 68 are intentionally weakened areas of the sheet of material 60. Among other things, the creases 68 can facilitate folding the sheet of material 60 to provide various busbar configurations.

In the exemplary embodiment, the creases 68 are linear and extend in a direction that is transverse to the longitudinal axis $L_m$ of the sheet of material 60. The creases 68 each substantially extend from a first lateral side 72 of the sheet of material 60 to an opposing, second lateral side 76 of the sheet of material 60.

Figure 5A:
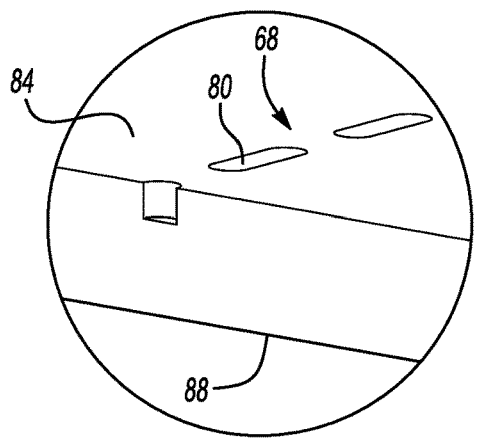
FIG. 5A shows a close-up view of an area of one of the creases according to an exemplary embodiment.

The creases 68 can be a plurality of perforations 80 within the sheet of material 60, as shown in FIG. 5A. The perforations 80 can be formed utilizing a punching process, for example. Each of the perforations 80 opens to an upwardly facing side 84 of the sheet of material 60. Each of the perforations 80 extends longitudinally from the upwardly facing side 84 for a distance that is about twenty-five to forty percent the thickness T of the sheet of material 60. In another example, the perforations 80 extend entirely through the sheet of material 60 such that the perforations 80 also open to a downwardly facing side 88 of the sheet of material 60 that is opposite the upwardly facing side 84.

Figure 5B:
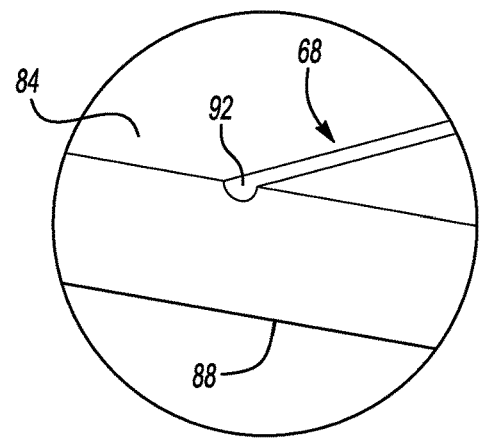
FIG. 5B shows a close-up view of an area of the creases according to another exemplary embodiment.

Another example of the creases 68 as shown in FIG. 5B where the crease 68 is provided by a compressed area 92 of the sheet of material 60. A press could be used to form the compressed area 92.

Figure 5C:
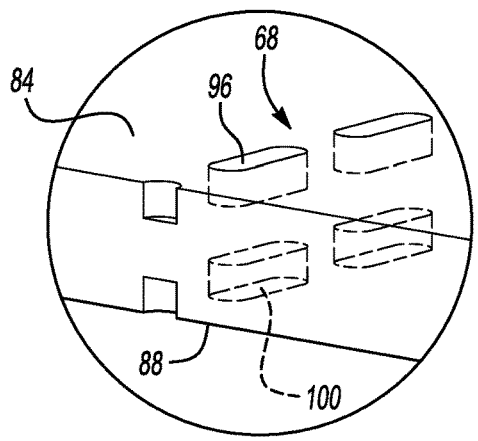
FIG. 5C illustrates a close-up view of an area of one of the creases according to yet another exemplary embodiment.

FIG. 5C illustrates yet another example of the creases 68 where a perforation 96 opens to the upwardly facing side 84 of the sheet of material 60, and another perforation 100 opens to the downwardly facing side 88 of the sheet of material 60.

Figure 5D:
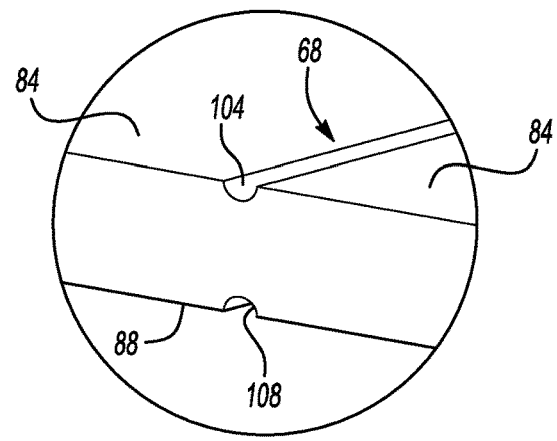
FIG. 5D illustrates a close-up view of an area of one of the creases according to still another exemplary embodiment.

FIG. 5D illustrates yet another example of the creases 68 where the crease is provided by a compressed area 104 in the upwardly facing side 84 of the sheet of material 60, and additionally a compressed area 108 formed within the downwardly facing side 88 of the sheet of material 60.

Referring again to FIG. 4, in the exemplary embodiment, the creases 68 are distributed along the sheet of material 60 such that the sheet of the material 60 is partitioned into a plurality of segments 112 that are nominally the same size. Each crease 68 represents a boundary between one of the segments 112 and an axially adjacent segment 112 relative to the longitudinal axis $L_m$ of the sheet of material 60.

In another example, the entire sheet of material 60 is not divided into equally sized segments. For example, a segment at an axial end of the sheet of material could be larger than the remaining segments. The larger segment is represented by broken lines 116.

With reference now to FIGS. 6-12, the sheet of material 60 having the creases 68 is folded according to a first process to provide the busbar 38 of FIG. 2 with the terminal receiving recess 42.

Figure 6:
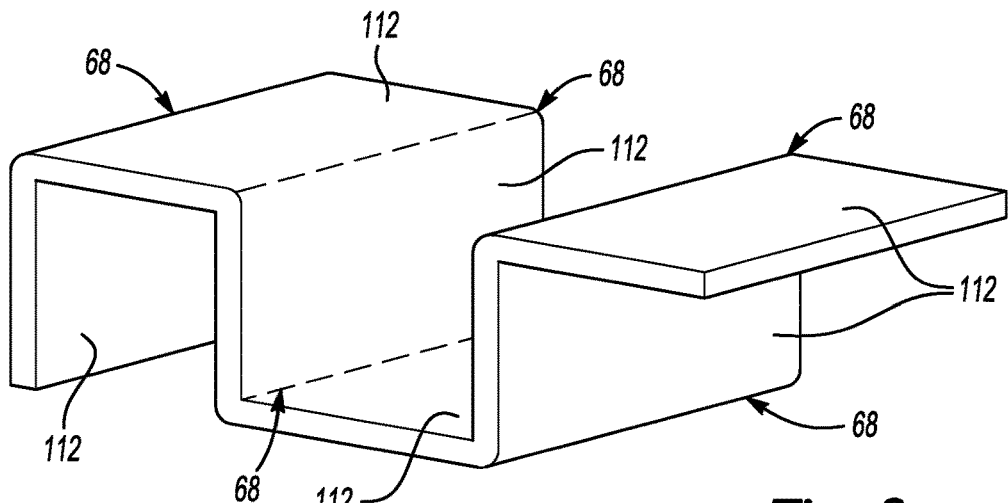
FIGS. 6-11 illustrate steps in a first process of forming the sheet of material with the creases from FIG. 4 into a busbar of a first configuration, and then securing the busbar of the first configuration to terminal tabs of selected battery cells within the array of FIG. 2.

The various segments 112 are initially folded relative to each other as shown in FIG. 6. The folding of some of the segments relative to others of the segments 112 is a folding about the creases 68. Again, the creases 68 encourage folding in the desired areas.

Folding the segments 112 relative to each other can be accomplished utilizing tooling such as, for example, a punch and die. The punch, for example, could have a dimension corresponding generally to an axial length of one of the segments 112. A position of the sheet of material 60 is then manipulated relative to the punch and die to fold the various segments 112 into the positions shown in FIG. 6.

Figure 7:
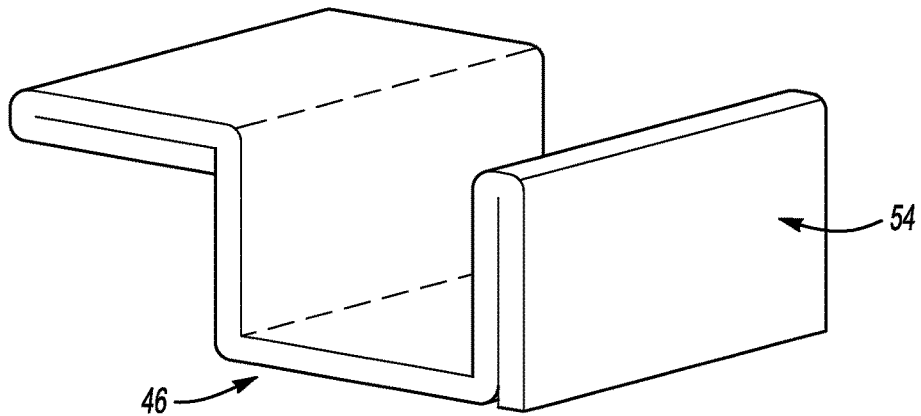
Figure 8:
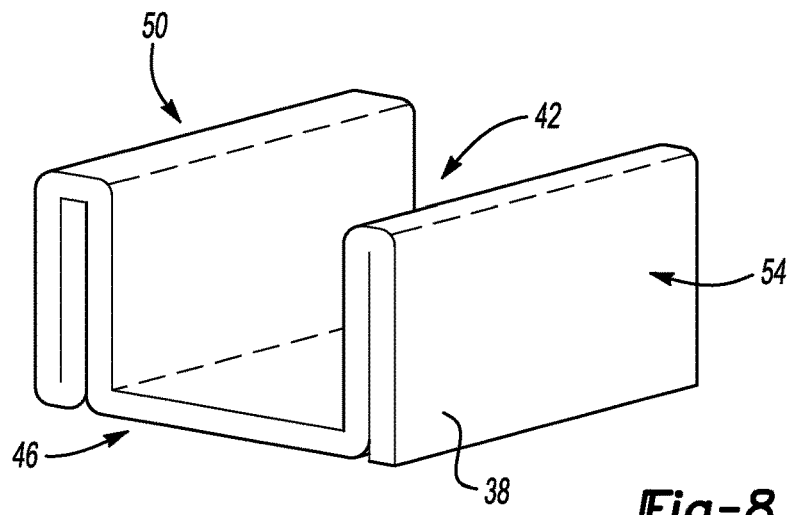

Next, the selected segments 112 are folded as shown in FIGS. 7 and 8 to provide the busbar 38 having the floor 46, the wall 50, and the wall 54. The folding and folding of the segments represented progressively in FIGS. 7 and 8 can be accomplished utilizing the tool, (e.g., the same punch and die) utilized to form the configuration of FIG. 6, or by using other appropriate tooling.

Figure 9:
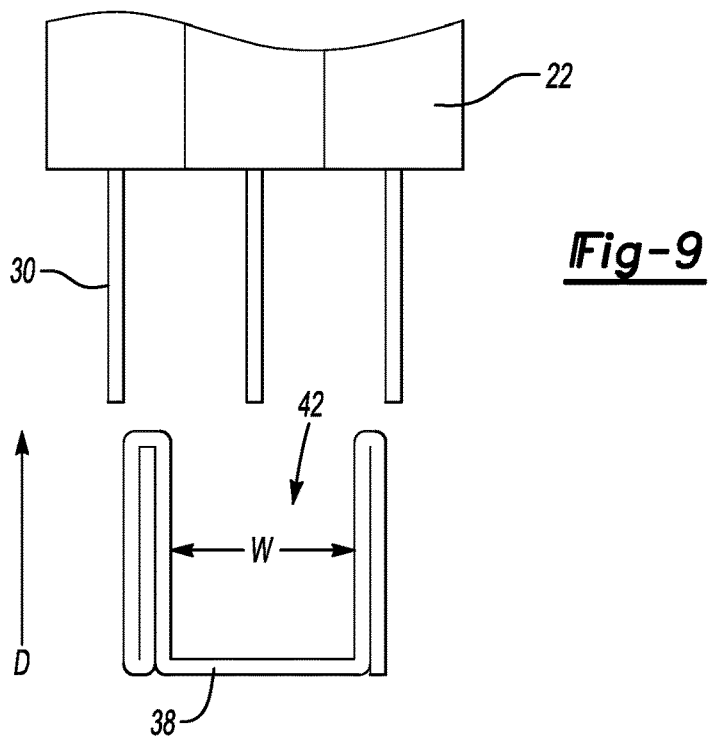

As shown in FIG. 9, the busbar 38 has a terminal receiving recess 42 having a width W. During assembly, the busbar 38 is moved in a direction D and the terminal tabs 30 positioned within the terminal receiving recess 42. The busbar 38 is desired to electrically couple to three of the terminal tabs 30. The terminal receiving recess 42 is thus sized such that the width W corresponds to a width appropriate for accommodating three of the terminal tabs 30.

Figure 10:
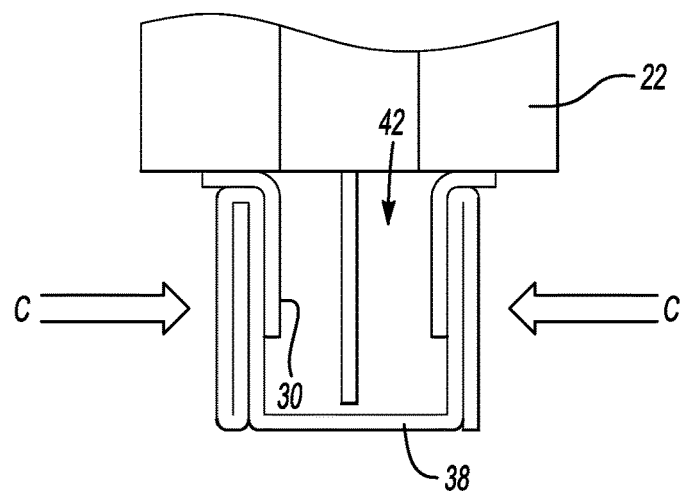
Figure 11:
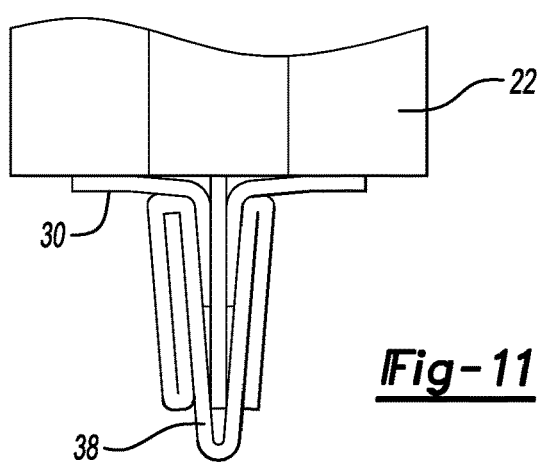
Figure 12:
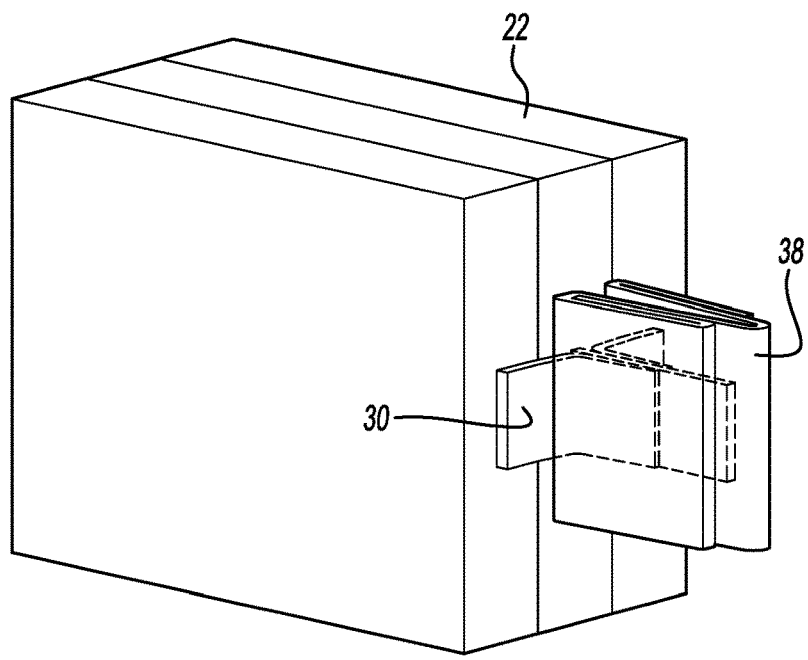
FIG. 12 illustrates a perspective view of the busbar of the first configuration from FIGS. 6-11 secured to three terminal tabs of battery cells from the array of FIG. 2.

As shown in FIGS. 10 and 11, after the terminal tabs 30 are positioned within the terminal receiving recess 42, the busbar 38 is clamped in the directions C against the terminal tabs 30 (and, optionally, welded) to hold the terminal tabs 30 with the busbar 38 and electrically couple the busbar 38 to the terminal tabs 30. During the clamping, a clamp can directly contact opposing axially facing sides of a busbar 38. The directions are aligned with a longitudinal axis of the array 20 of battery cells 22 (FIG. 2). After clamping, the busbar 38 is electrically coupled to the terminal tabs 30 of the battery cells 22 as shown in FIG. 12.

The busbars 38 can instead, or in addition to clamping, be welded (typically ultrasonic or laser) or bolted to the terminal tabs 30. Depending on the width of the terminal tabs 30 and the retention force requirement, multiple weld joints can be added (typically 2 to 3 to ensure good contact). If bolted, a hole can be punched through the busbar 38 and the terminal tabs 30 prior to the bolting. The torque on the bolt can be driven by the retention force requirements.

In some examples, clamping different numbers of the terminal tabs 30 or 34 with the busbar 38 is desired. To provide a busbar appropriate for clamping, say, six of the terminal tabs 30 or 34, the sheet of material 60 with the creases 68 that is shown in FIG. 4 can be formed according to a different, second process of FIGS. 13-18 to provide a busbar 38a with a terminal receiving recess 42a having a width $W_a$ that is greater than the width W of the terminal receiving recess 42 shown in FIG. 9.

Figure 13:
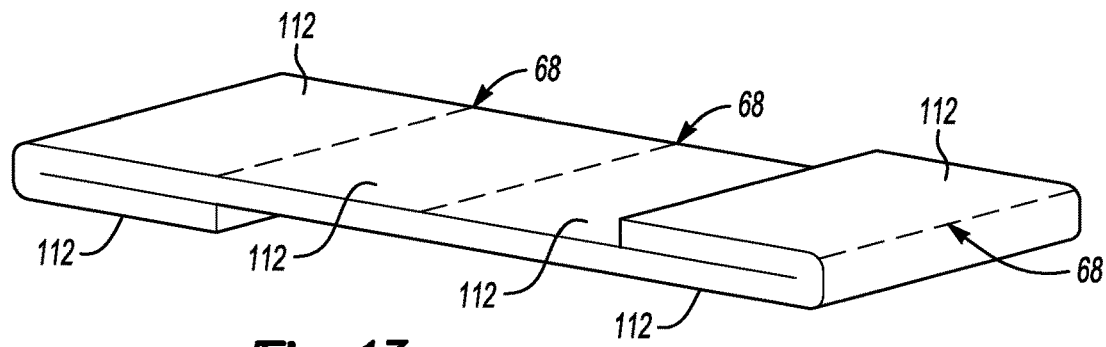
FIGS. 13-17 illustrate steps in a second process of forming the sheet with the creases from FIG. 4 into a busbar of a second configuration, and then securing the busbar of the second configuration to terminal tabs of selected battery cells within the array of FIG. 2.
Figure 14:
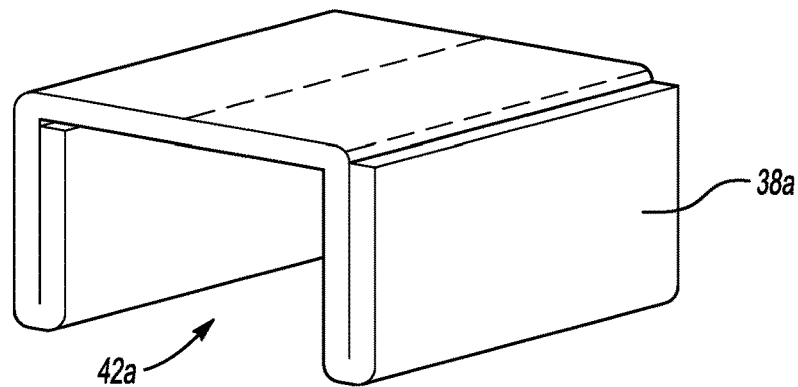

The second process involves initially folding the sheet of material 60 as shown in FIG. 13, and then folding selected segments 112 again relative to other segments 112 to provide the terminal receiving recess 42a shown in FIG. 14.

Figure 15:
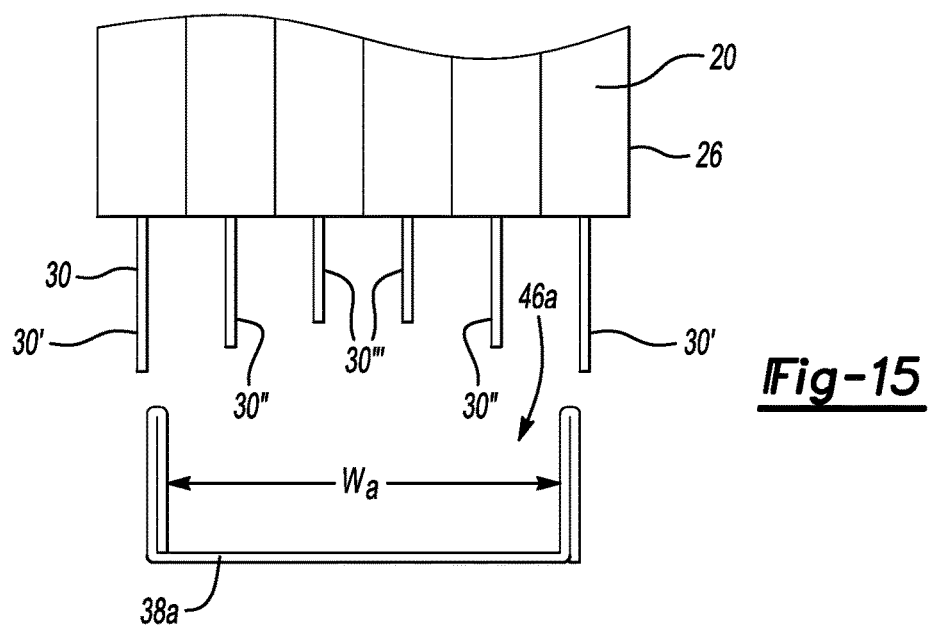
Figure 16:
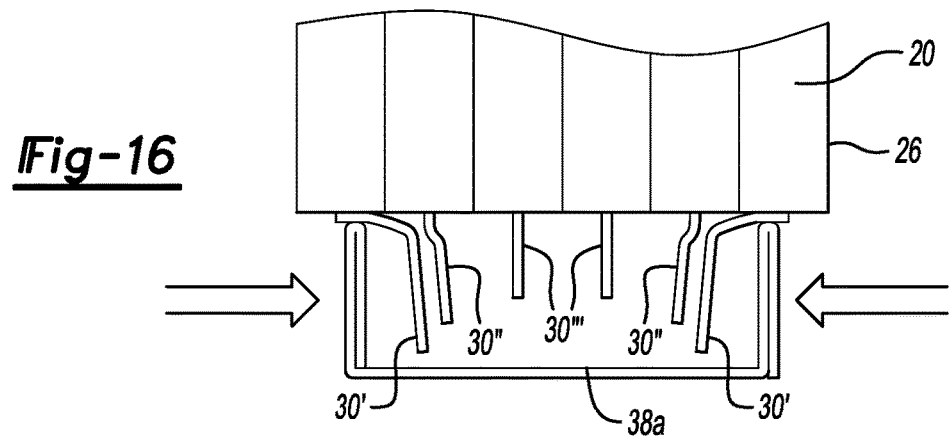
Figure 17:
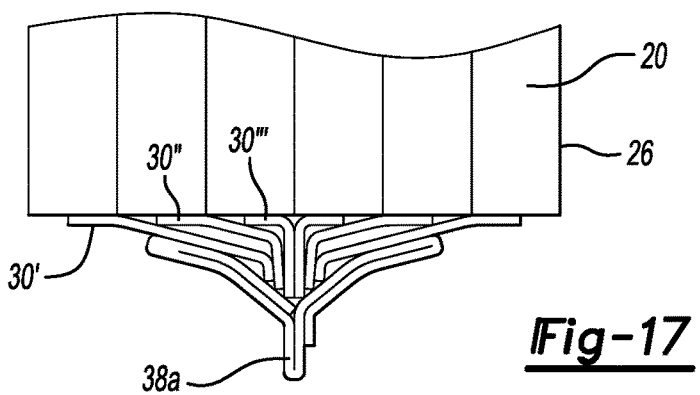
Figure 18:
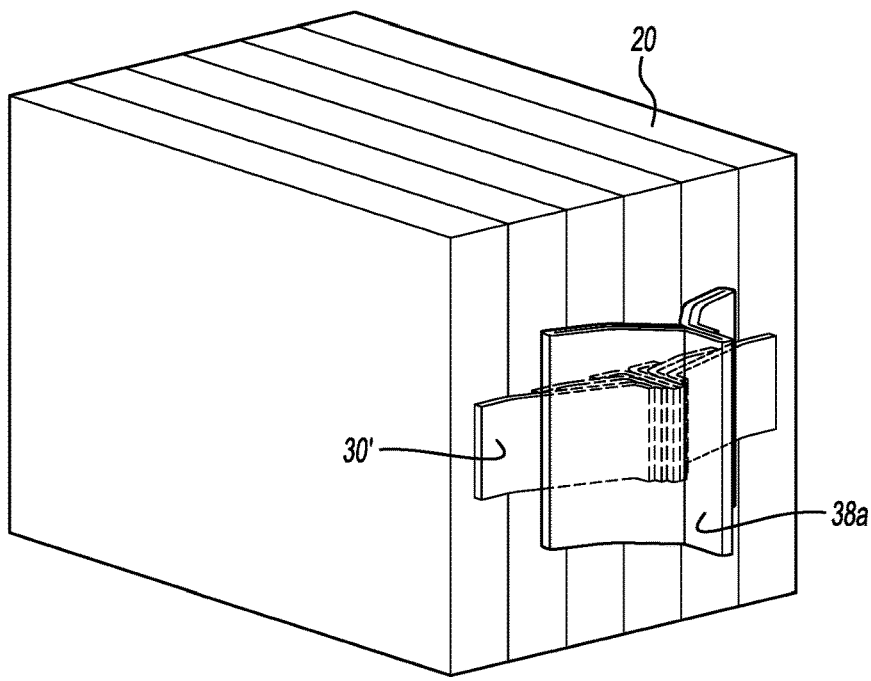
FIG. 18 illustrates a perspective view of the busbar of the second configuration from FIGS. 13-17 secured to six terminal tabs of battery cells from the array of FIG. 2.
Figure 19:
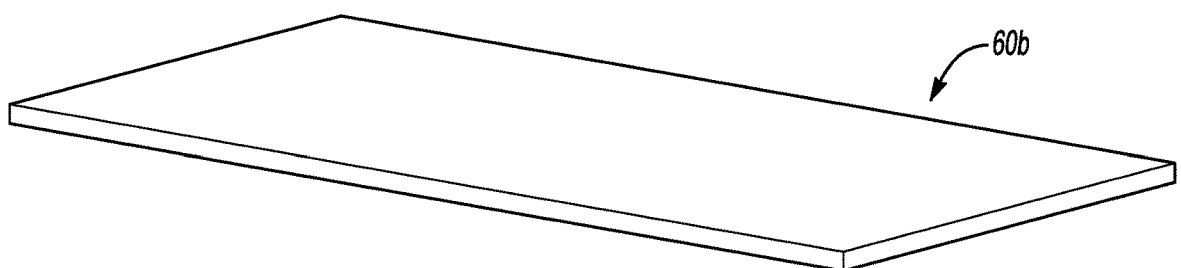
FIGS. 19-25 illustrates the steps in another process of forming a sheet to provide a busbar of a third configuration, and then securing the busbar to terminal tabs of selected battery cells within the array of FIG. 2.

The tooling utilized for forming the busbar 38a as shown in FIG. 14 can be the same as the tooling utilized to form the busbar 38 shown in FIG. 8. This is due to, among other things, the locations of the creases 68 being the same for the busbar 38 and the busbar 38a. After providing the busbar 38a, the busbar is moved, as shown in FIGS. 15 and 16, over terminal tabs 30 of the battery cells 22 and then clamped into a final position as shown in FIG. 17.

In this example, the terminal tabs 30' are the axially outermost terminal tabs with reference to the longitudinal axis of the array 20. The terminal tabs 30' extend from the outer case 26 of the respective battery cells 22 further than the terminal tabs 30" closer to axial center of the terminal receiving recess 42a. The terminal tabs 30" extends from the outer case 26 of the battery cells 22 further than the central terminal tabs 30'". Varying the lengths of the terminal tabs 30 such that the outer terminal tabs 30' are longer than the inner terminal tabs 30" and 30'" can help to ensure that, after clamping, the terminal tabs 30' are appropriately retained and clamped by the busbar 38a.

Figure 20:
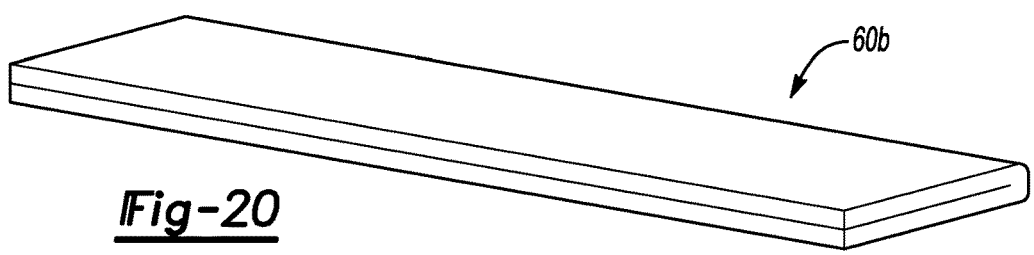

Referring now to FIGS. 19-26, in another example, a busbar 38b is formed according to a different process. Initially, a sheet of material 60b is folded along a longitudinal axis of the sheet of material 60b to provide a double layer of material as shown in FIG. 20. A crease along the longitudinal axis could be formed to facilitate this folding.

Figure 21:
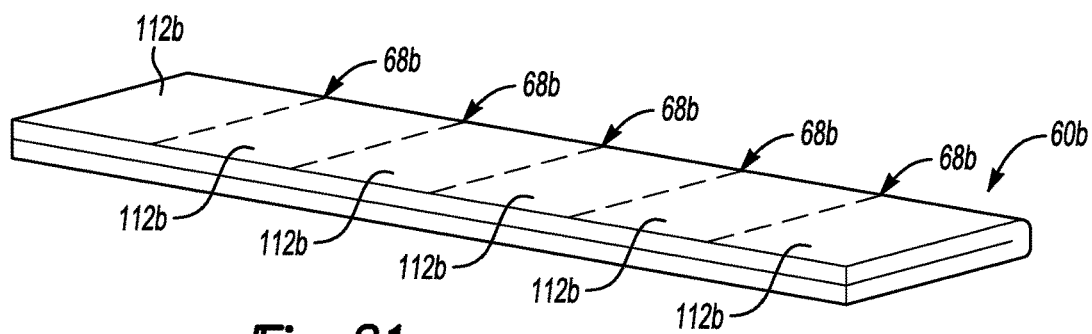

The double layers of material 60b can then be formed to include a plurality of creases 68b as shown in FIG. 21. The creases 68b can be similar to the creases 68 in FIG. 4.

Figure 22:
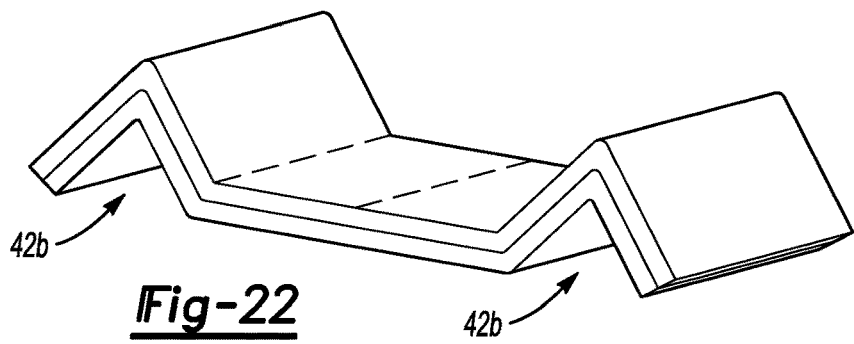
Figure 23:
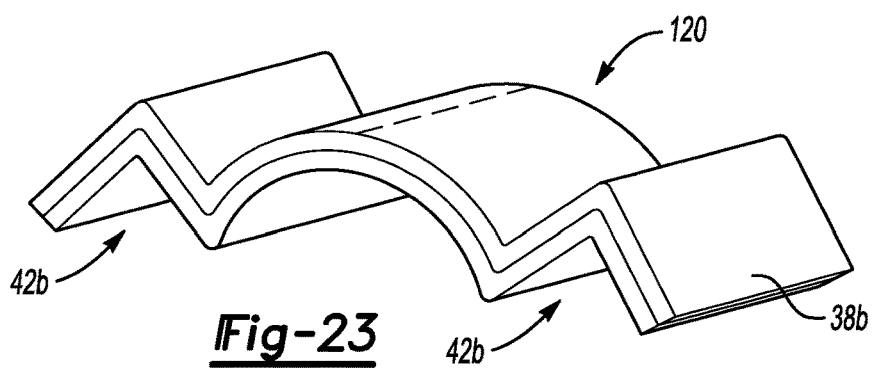

At least some of the segments 112b established by the creases 68b are then folded relative to each other as shown in FIG. 22. This establishes two separate terminal receiving recesses 42b within the busbar 38b. Next, the segments 112b between the terminal receiving recesses 42b are formed to have a bowed type configuration as shown in FIG. 23. The busbar 38b formed from the sheet of material 60b thus includes two terminal recesses 42b connected by a bowed area 120.

The bowed area 120 can be formed using a semi-cylindrical tool that pushes the segments 112b between the terminal receiving recesses 42 into a preformed surface to control the shape of the bow. Forming the bowed area 120 can essentially involve a stamping process.

Figure 24:
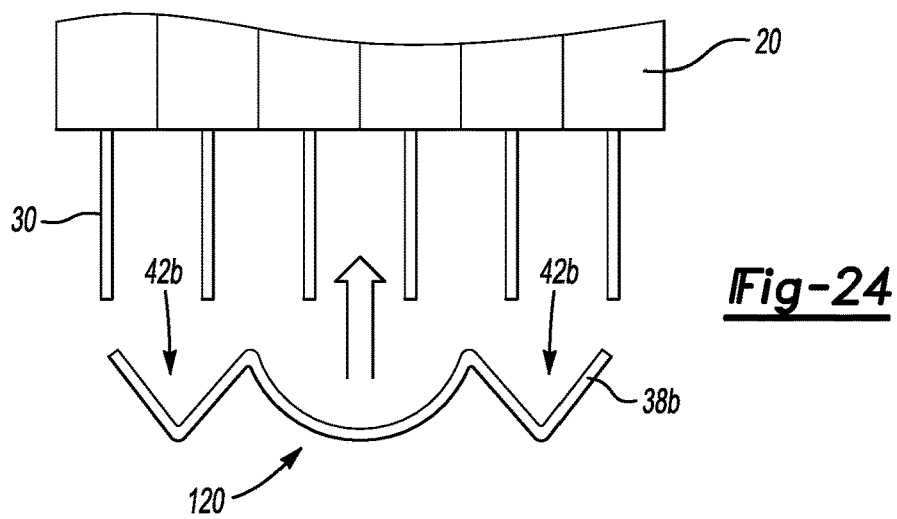
Figure 25:
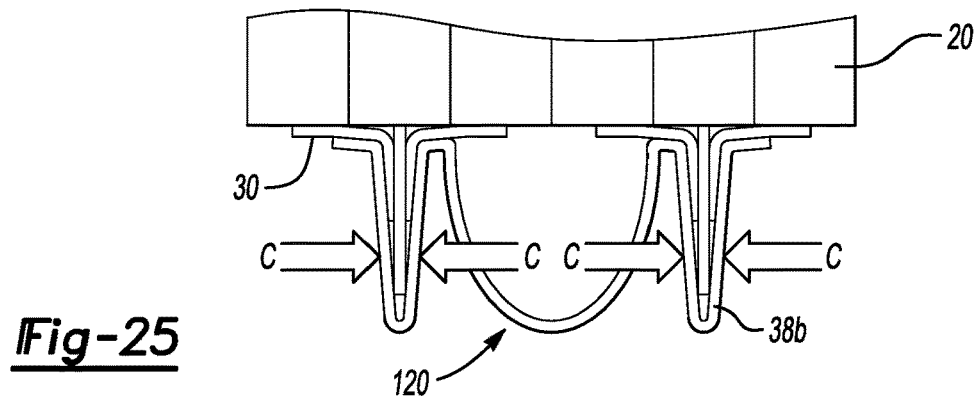
Figure 26:
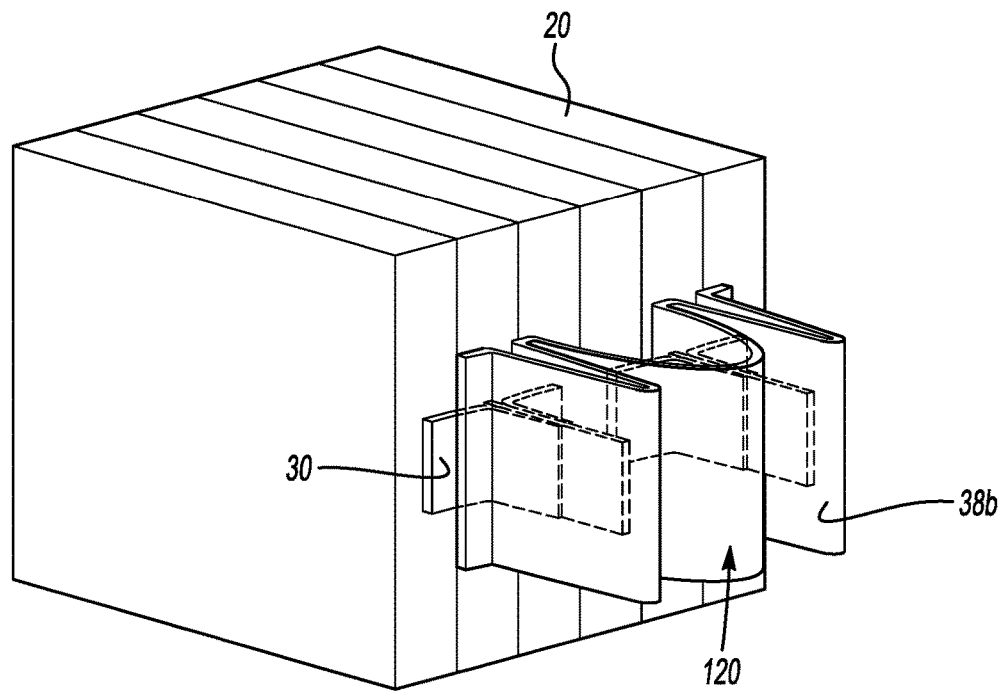
FIG. 26 illustrates a perspective view of the busbar of the third configuration from FIGS. 19-25 secured to a first and second groups of three terminal tabs of battery cells from the array of FIG. 2.

The busbar 38 can then be secured to terminal tabs 30 of battery cells 22 as shown in FIGS. 24-26. In this exemplary embodiment, each of the terminal receiving recesses 42b clamps and secures to three terminal tabs 30.

After securing the busbar 38b, the bowed area 120 can accommodate relative movement between the terminal tabs 30 received within one of the terminal receiving recesses 42b, and the terminal tabs 30 received in the other of the terminal receiving recesses 42b. For example, the bowed area 120 can act as a spring that flexes when the terminal tabs 30 held by one of the terminal receiving recesses 42b moves axially relative to the terminal tabs 30 held by the other of the terminal receiving recesses 42b. Among other things, the flexing can accommodate some relative axial movement to avoid such movement disrupting a connection between the terminal tabs 30 and the busbar 38b. The relative movement may be due to the battery cells 22 expanding and contracting during operation.

Figure 27:
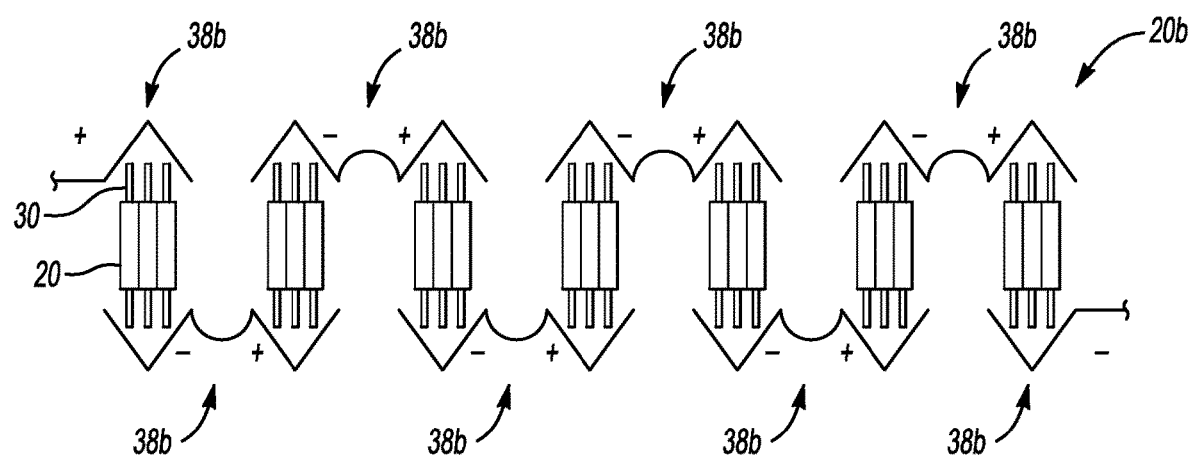
FIG. 27 shows a top view of an array of battery cells with a plurality of busbars of the third configuration from FIGS. 19-26 prior to securing the plurality of busbars of the third configuration to terminal tabs of the battery cells in the array of FIG. 27.

Referring now to FIG. 27, several of the busbars 38b could be disposed about an array 20b to provide desired electrical connection between various groupings of battery cells 22. The busbars 38 and 38a could be distributed about the array 20 in a similar manner.

Features of the disclosed examples include busbar forming methods that utilize different processes to form a similarly sized sheet of material into busbars having various configurations. The various configurations can be used to accommodate and secure to differing numbers of battery terminal tabs and for accommodating various environments within a battery pack. Providing busbars of various configurations from a similar sized piece of material can simplify assembly. Further, the various configurations can be provided utilizing similar tooling as the segments of the various configurations can be similarly sized.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A busbar forming method, comprising:
    creasing a sheet of material to form a plurality of creases that partition the sheet into a plurality of segments; and
    identifying a desired size for a desired terminal receiving recess in a desired busbar; and
    in response to the desired size, folding at least some of the segments relative to each other about at least some of the creases according to a first folding process, or a different, second folding process,
    wherein the sheet with at least some of the segments folded according to the first folding process provides a first busbar having a terminal receiving recess of a first size,
    wherein the sheet with at least some of the segments folded according to the second folding process provides a second busbar having a terminal receiving recess of a second size that is different than the first size,
    wherein a portion of the busbar providing the terminal receiving recess includes a bottom and opposing sides, wherein at least one of the opposing sides includes some of the segments folded against each other.

2. The method of claim 1, wherein the creases each extend linearly in a direction transverse to a longitudinal axis of the sheet.

3. The method of claim 2, wherein the creases are distributed along a longitudinal axis of the sheet and each of the creases extends from a first lateral side of the sheet to an opposite, second lateral side of the sheet.

4. The method of claim 1, wherein the segments are each equally sized.

5. The method of claim 1, wherein the creasing comprises at least partially perforating the sheet to establish the creases.

6. The method of claim 1, wherein the first folding process and the second folding process both include folding some of the same segments relative to each other about some of the same creases.

7. The method of claim 1, wherein the creases are distributed such that a punch of a tool can fold the sheet according to the first folding process, and the same punch can fold the sheet according to the second folding process.

8. The method of claim 1, further comprising, after the folding, clamping a portion of the first busbar providing the terminal receiving recess to sandwich a first number of battery terminal tabs.

9. The method of claim 8, wherein the first busbar extends along a longitudinal axis, and the clamping comprises directly contacting opposing axially facing sides of the portion of the first busbar providing the terminal receiving recess.

10. A busbar forming method, comprising:
creasing a sheet of material to form a plurality of creases that partition the sheet into a plurality of segments; and
identifying a desired size for a desired terminal receiving recess in a desired busbar; and
in response to the desired size, folding at least some of the segments relative to each other about at least some of the creases according to a first folding process, or a different, second folding process,
wherein the sheet with at least some of the segments folded according to the first folding process provides a first busbar having a terminal receiving recess of a first size,
wherein the sheet with at least some of the segments folded according to the second folding process provides a second busbar having a terminal receiving recess of a second size that is different than the first size,
wherein the terminal receiving recess in the first busbar is a first terminal receiving recess and further comprising folding at least some of the segments relative to each other about some of the creases to provide a second terminal receiving recess in the first busbar that is spaced from the first terminal receiving recess.

11. The method of claim 10, further comprising clamping the first and second terminal recesses to a respective first and second group of battery terminal tabs, and using a portion of the first busbar extending between the first and second terminal recesses as a spring to accommodate movement of the first and second groups of battery terminal tabs relative to each other during operation.

12. A battery assembly, comprising:
a busbar formed from a sheet of material, the busbar having a terminal receiving recess; and
a plurality of creases formed within the sheet that partition at least a portion of the sheet into a plurality of segments, wherein at least some of the segments are folded relative to each other about at least some of the creases to provide the terminal receiving recess in the busbar, wherein the terminal receiving recess is a first terminal receiving recess of a first size, wherein at least some of the segments are capable of being folded relative to each other about at least some of the creases to provide a busbar having a second terminal receiving recess of a different, second size.

13. The assembly of claim 12, wherein the plurality of segments are equally sized.

14. The assembly of claim 12, wherein at least some of the creases about which some of the segments are capable of being folded to provide the busbar having the terminal receiving recess of the first size, are the same as the creases about which some of the segments are capable of being folded to provide the busbar having the terminal receiving recess of the second size.

15. The assembly of claim 12, wherein the creases each extend transverse to a longitudinal axis of the sheet, and the creases are distributed along the longitudinal axis such that the plurality of creases divide the sheet into a plurality of segments that are equally sized.

16. The assembly of claim 12, wherein the creases are areas of the sheet of material that are at least partially perforated.

17. The assembly of claim 12, further comprising more than one terminal of a battery sandwiched within the terminal receiving recess.

18. The assembly of claim 17, wherein the at least one terminal comprises a first terminal tab extending a first distance from a outermost case of a first battery cell, and further comprises a second terminal tab extending a greater, second distance from an outermost case of second battery cell such that a portion of the first terminal tab outside the case is longer than a portion of the second terminal tab that is outside the case.

* * * * *